US008947710B2

(12) United States Patent
Nakamura

(10) Patent No.: US 8,947,710 B2
(45) Date of Patent: Feb. 3, 2015

(54) IMAGE PROCESSING APPARATUS THAT PERFORMS REPRODUCTION SYNCHRONIZATION OF MOVING IMAGE BETWEEN THE SAME AND MOBILE INFORMATION TERMINAL, METHOD OF CONTROLLING IMAGE PROCESSING APPARATUS, STORAGE MEDIUM, AND IMAGE PROCESSING SYSTEM

(71) Applicant: Canon Kabushiki Kaisha, Tokyo (JP)

(72) Inventor: Ken Nakamura, Hachioji (JP)

(73) Assignee: Canon Kabushiki Kaisha (JP)

( * ) Notice: Subject to any disclaimer, the term of this patent is extended or adjusted under 35 U.S.C. 154(b) by 37 days.

(21) Appl. No.: 13/737,118

(22) Filed: Jan. 9, 2013

(65) Prior Publication Data
US 2013/0176593 A1    Jul. 11, 2013

(30) Foreign Application Priority Data

Jan. 11, 2012  (JP) ................................. 2012-003173

(51) Int. Cl.
*G06F 3/12* (2006.01)
*H04N 1/00* (2006.01)
(52) U.S. Cl.
CPC ....... *H04N 1/00278* (2013.01); *H04N 1/00204* (2013.01); *H04N 1/00307* (2013.01); *H04N 1/00408* (2013.01); *H04N 2201/001* (2013.01); *H04N 2201/0055* (2013.01); *H04N 2201/0094* (2013.01)
USPC ............ 358/1.15; 358/1.6; 358/501; 358/413
(58) Field of Classification Search
CPC .................................................... G06F 3/1229

USPC .................................................. 358/1.1–3.29
See application file for complete search history.

(56) References Cited

U.S. PATENT DOCUMENTS

2010/0036904 A1* 2/2010 Nakamoto .................... 709/202
2010/0060650 A1* 3/2010 Yamakami ..................... 345/474

FOREIGN PATENT DOCUMENTS

| JP | 08-069223 A | | 3/1996 | |
| JP | 2010-039945 | * | 2/2010 | .............. G06F 15/00 |
| JP | 2010-039945 A | | 2/2010 | |

* cited by examiner

*Primary Examiner* — Benny Q Tieu
*Assistant Examiner* — Marcellus Augustin
(74) *Attorney, Agent, or Firm* — Rossi, Kimms & McDowell LLP

(57) ABSTRACT

An image processing apparatus capable of facilitating synchronization of a maintenance moving image between an image processing apparatus and a mobile information terminal, thereby making it possible to more efficiently show the moving image to a user who performs a maintenance operation. The mobile information terminal is registered as a distribution destination of the moving image. The moving image for current reproduction and display on the apparatus and information of the reproduction position of the moving image are distributed to the terminal to thereby cause the terminal to reproduce and display the moving image from the position. The position is changed based on information of a change in the reproduction position received from the terminal. When the position is changed on the image apparatus, information of a change in the position is transmitted to the terminal, to thereby cause the terminal to change the position.

21 Claims, 11 Drawing Sheets

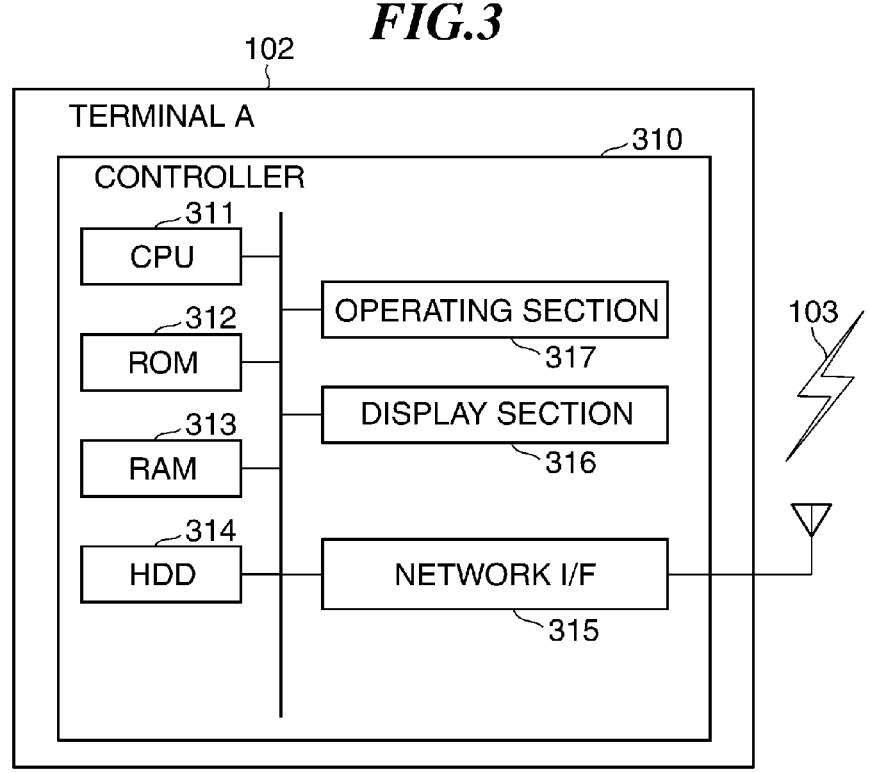
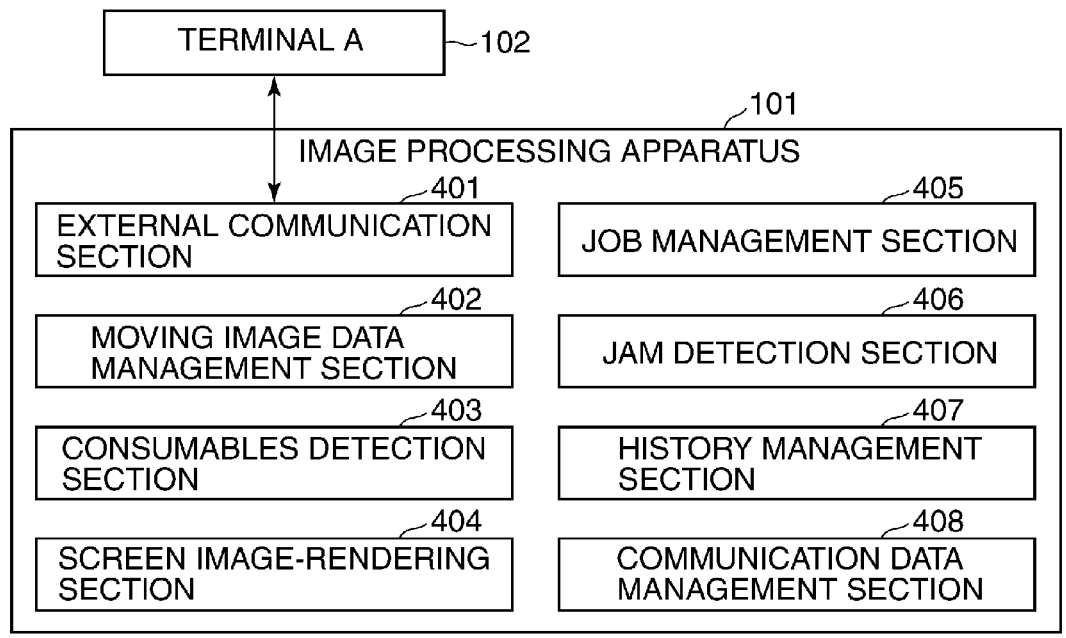

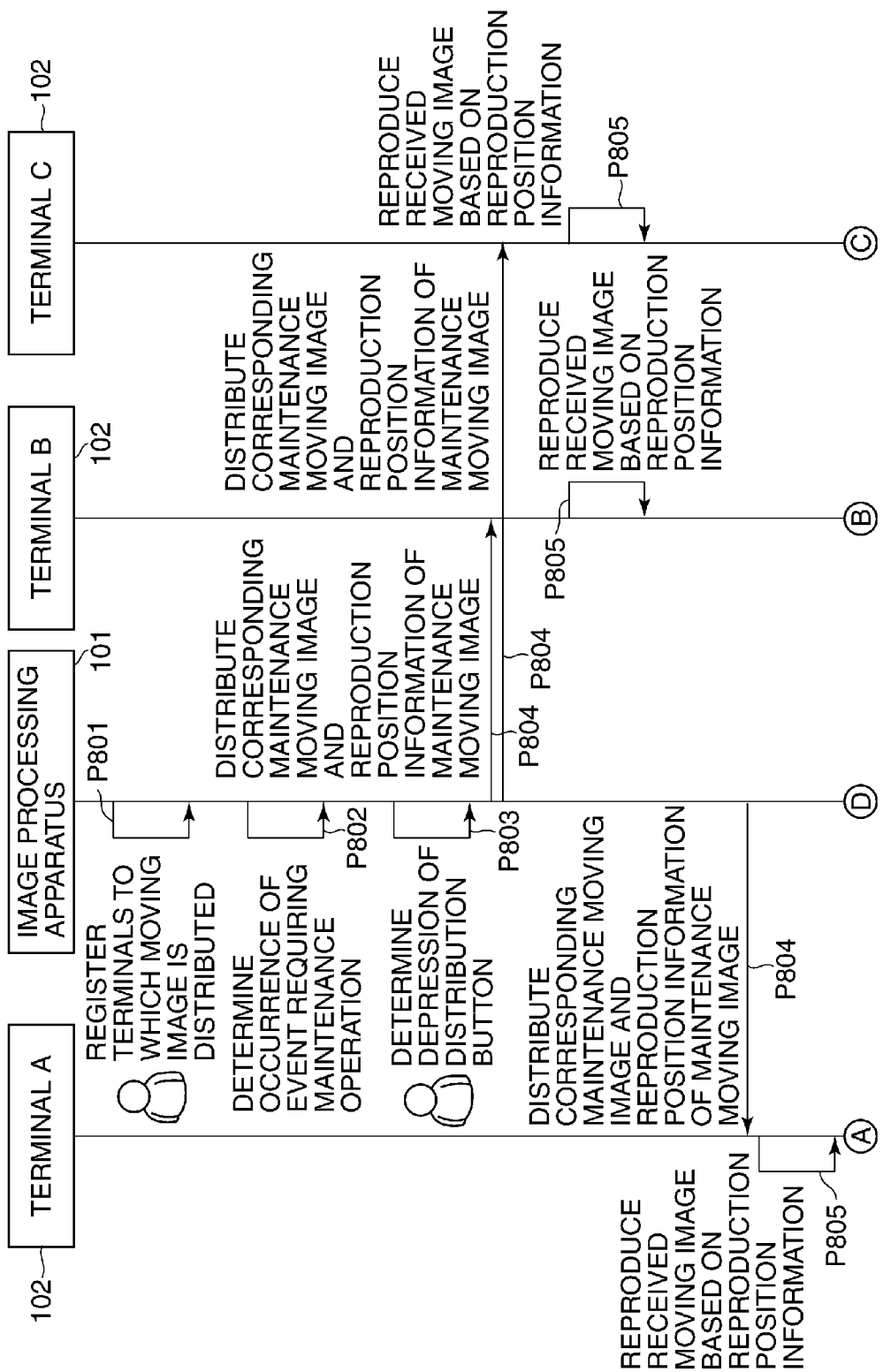

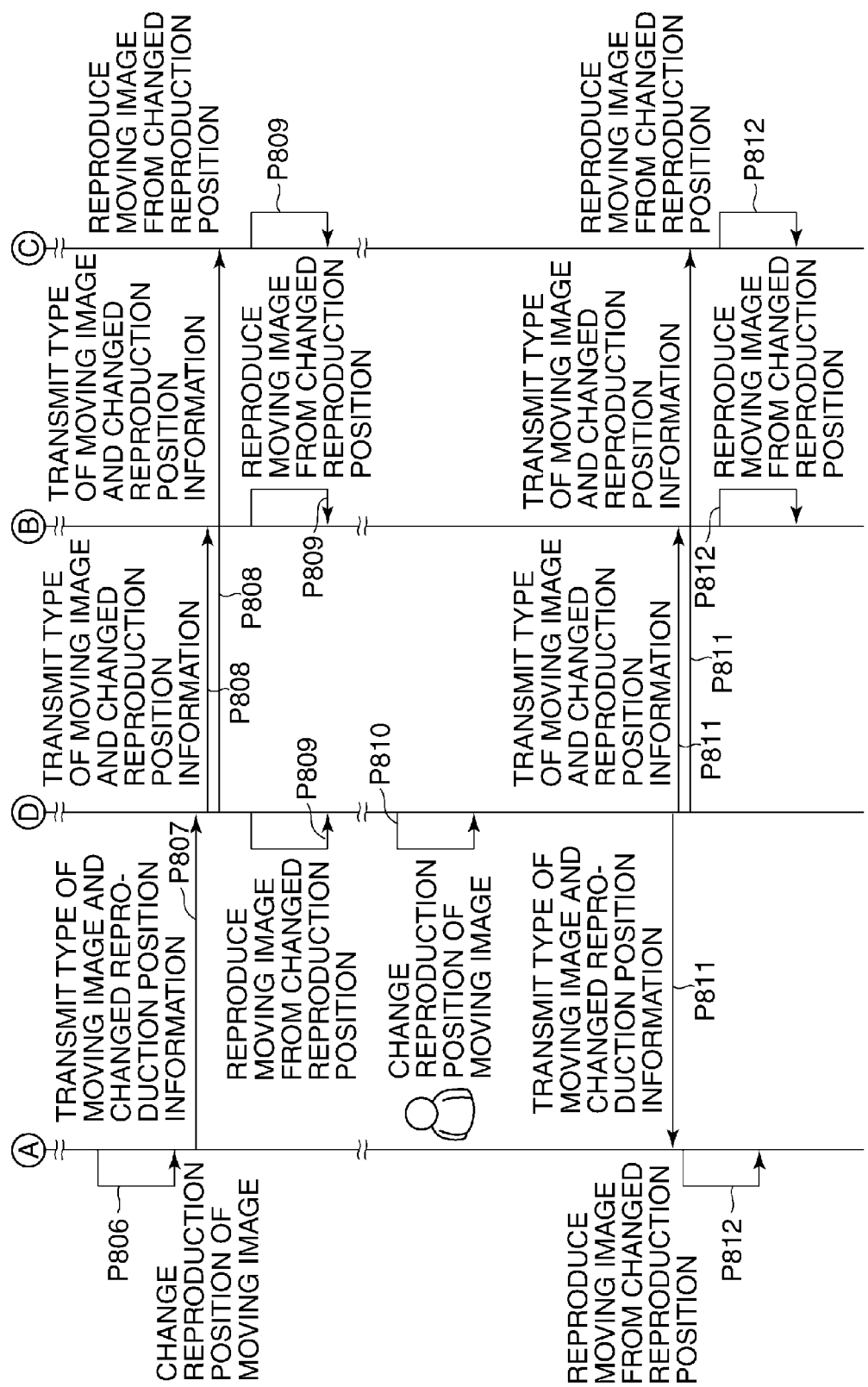

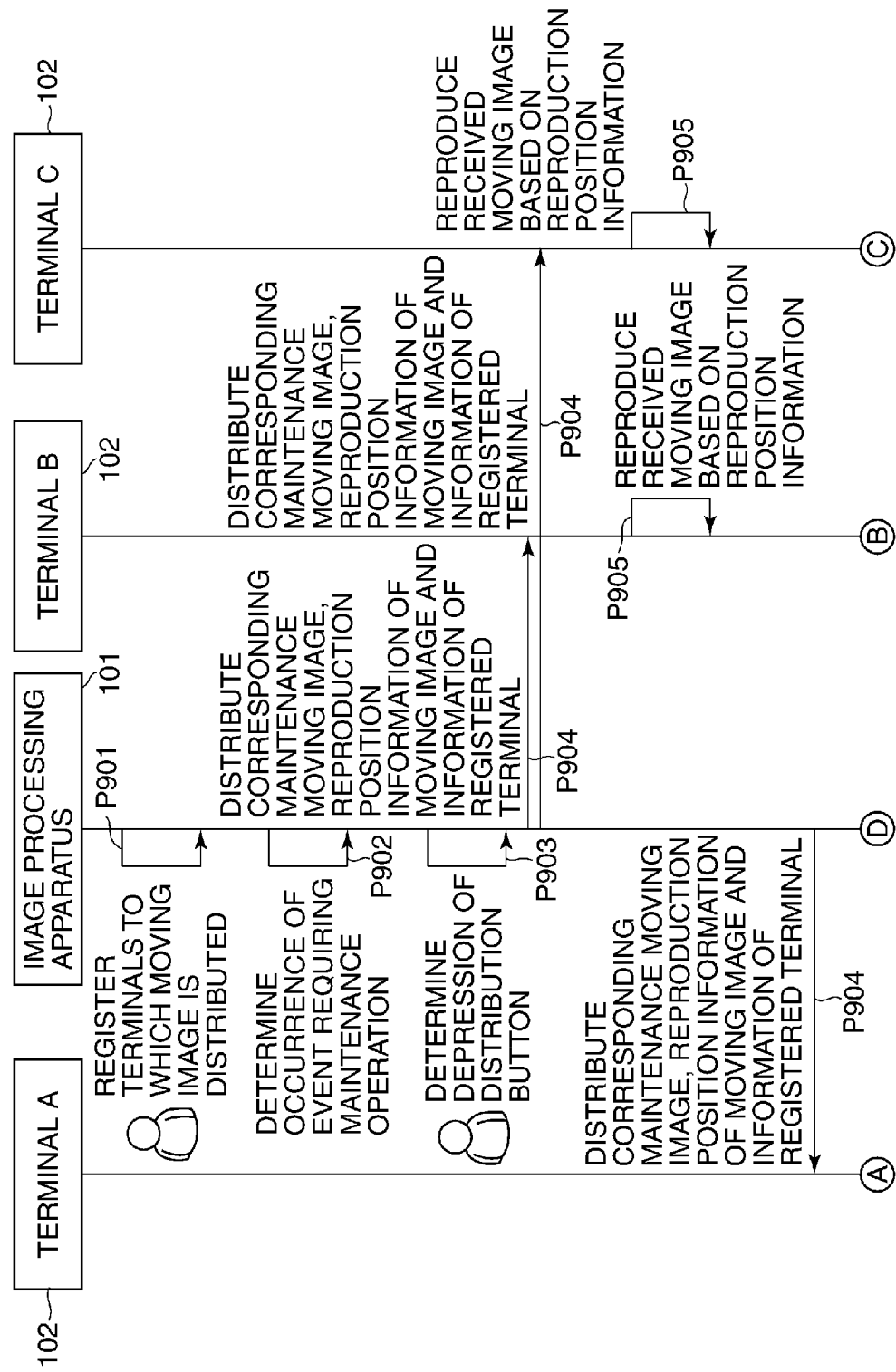

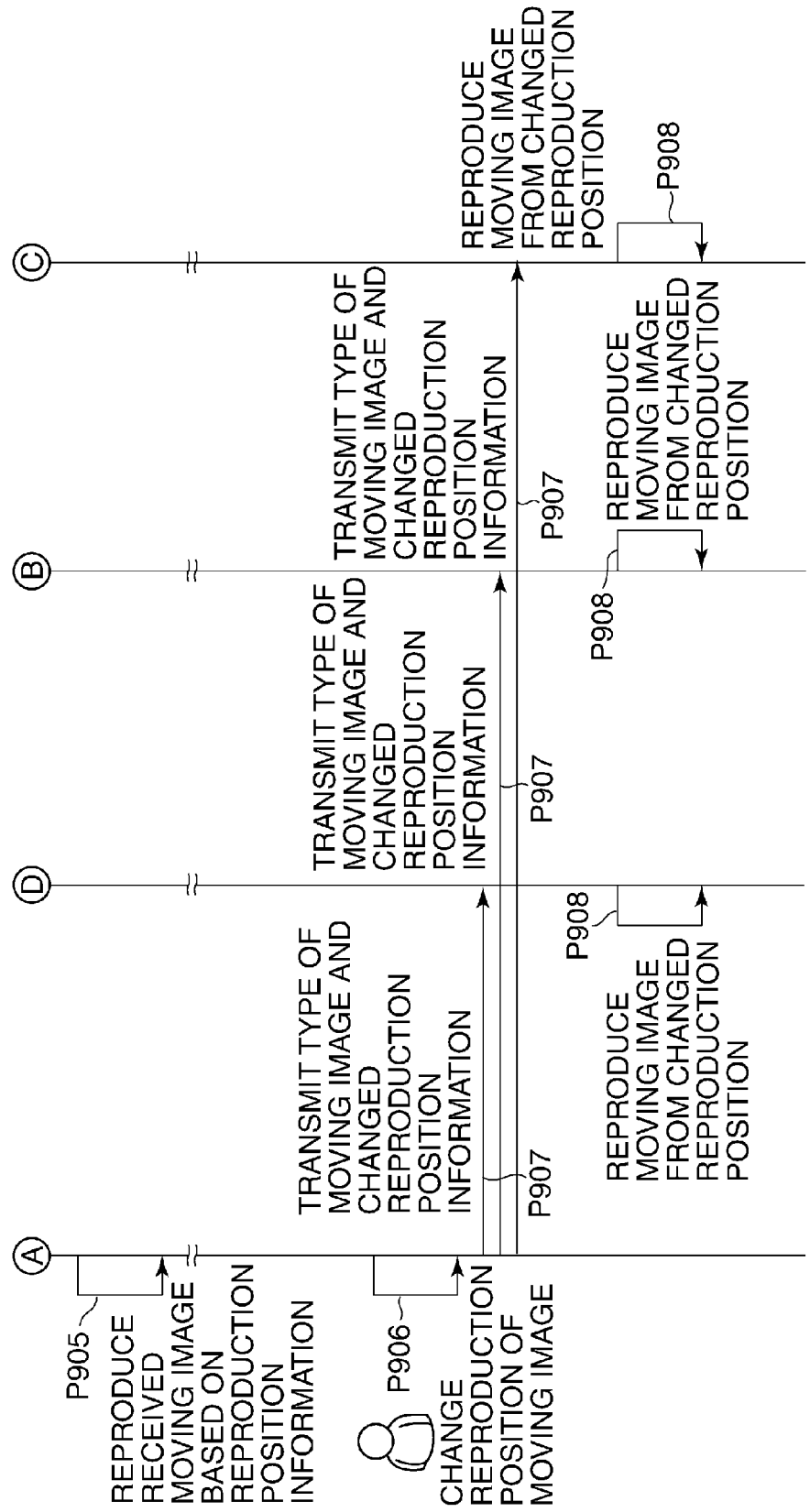

IMAGE PROCESSING APPARATUS THAT PERFORMS REPRODUCTION SYNCHRONIZATION OF MOVING IMAGE BETWEEN THE SAME AND MOBILE INFORMATION TERMINAL, METHOD OF CONTROLLING IMAGE PROCESSING APPARATUS, STORAGE MEDIUM, AND IMAGE PROCESSING SYSTEM

BACKGROUND OF THE INVENTION

1. Field of the Invention

The present invention relates to an image processing apparatus, a method of controlling the image forming apparatus, a storage medium, and an image processing system, and more particularly to a method of displaying a procedure of maintenance processing to be performed on an image forming apparatus.

2. Description of the Related Art

In recent years, there has been proposed an image processing apparatus configured such that when an operation for removing a jammed paper, replenishing toner, or the like is required, with a view to providing a guide e.g. for removal of the jammed paper, the apparatus displays illustrations on the apparatus and messages concerning a procedure of operations, on a liquid crystal display provided on a console section thereof, to thereby prompt the user to perform the operations. Further, a method of providing an instruction for operation using a moving image (video or animation) has also been proposed. These methods make it possible to explain a complicated operation in a detailed manner and display a delicate moving operation while showing location requiring such operations, thereby facilitating the operations to be performed by user (see e.g. Japanese Patent Laid-Open Publication NO. H08-69223).

However, depending on the construction of an accessory for the image processing apparatus, it is sometimes difficult for the user to remove a jammed paper while checking maintenance the moving image displayed on the liquid crystal display. In such a case, to check a location where a jam has occurred and a maintenance moving image displayed on the liquid crystal display, it has been required to go over to the location where the jam has occurred and return to the liquid crystal display many times. On the other hand, depending on the location of the image processing apparatus where the jam occurred, it is possible to save time and effort required for going over to the location where the jam has occurred and returning to the liquid crystal display many times, by distributing the maintenance moving image to a mobile information terminal including a PDA (personal digital assistant) and a mobile phone (see e.g. Japanese Patent Laid-Open Publication NO. 2010-039945).

However, after the user has performed a maintenance operation while viewing the screen of the mobile information terminal at a location remote from the liquid crystal display of the image processing apparatus, when the user is about to perform a maintenance operation while viewing the liquid crystal display at a location where the user can view the liquid crystal display, there arises the following problem: There is a case where a reproduction position of the moving image reproduced on the mobile information terminal and a reproduction position of the moving image reproduced on the image processing apparatus are different from each other. This requires fast forward or rewind of the reproduced maintenance moving image on the liquid crystal display of the image processing apparatus, and hence there is a fear that the user cannot perform the maintenance operation efficiently.

If the problem is concerned with the moving image, it can be solved by using VNC (Virtual Network Computing), but it is impossible to transmit or receive audio using VNC, which makes it impossible to use VNC when the moving image includes audio. Further, when the moving image is displayed on the mobile information terminal using VNC, the moving image displayed by VNC is not smooth, which is impractical. The screen size of the display section of the mobile information terminal and the terminal's storage capacity for storing moving images are limited, so that as for a location where the user can view the liquid crystal display of the image processing apparatus, it is possible to more efficiently perform the maintenance operation by viewing the liquid crystal display of the image processing apparatus.

SUMMARY OF THE INVENTION

The present invention provides a synchronization control technique which is capable of facilitating synchronization of maintenance moving image between an image processing apparatus and a mobile information terminal, thereby making it possible to more efficiently show the maintenance moving image to a user who performs a maintenance operation.

In a first aspect of the present invention, there is provided an image processing apparatus including a communication unit that performs wireless connection with a mobile information terminal, a display unit that reproduces and displays a moving image, and an operation unit that is capable of changing a reproduction position of the moving image, comprising a registration unit configured to register the mobile information terminal as a distribution destination of the moving image, a distribution unit configured to distribute the moving image for current reproduction and display on the display unit and information on a reproduction position of the moving image to the mobile information terminal registered by the registration unit, using the communication unit, to thereby cause the mobile information terminal to reproduce and display the moving image from the reproduction position of the moving image, and a first synchronization control unit configured to change, based on changed information of the reproduction position of the moving image, which is received via the communication unit from the mobile information terminal registered by the registration unit, the reproduction position of the moving image being reproduced and displayed on the display unit.

In a second aspect of the present invention, there is provided an image processing apparatus including a communication unit that performs wireless connection with a plurality of mobile information terminals, a display unit that reproduces and displays a moving image, and an operation unit that is capable of changing a reproduction position of the moving image, comprising a registration unit configured to register the plurality of mobile information terminals as distribution destinations of the moving image, a distribution unit configured to distribute the moving image for current reproduction and display on the display unit and information on a reproduction position of the moving image to the plurality of mobile information terminals registered by the registration unit, using the communication unit, to thereby cause the plurality of mobile information terminals to each reproduce and display the moving image from the reproduction position of the moving image, and a first synchronization control unit configured to change, based on changed information of the reproduction position of the moving image, which is received via the communication unit from any one of the plurality of mobile information terminals registered by the registration unit, the reproduction position of the moving image being reproduced and displayed on the display unit.

In a third aspect of the present invention, there is provided a method of controlling an image processing apparatus including a communication unit that performs wireless connection with a mobile information terminal, a display unit that reproduces and displays a moving image, and an operation unit that is capable of changing a reproduction position of the moving image, comprising registering the mobile information terminal as a distribution destination of the moving image, distributing the moving image for current reproduction and display on the display unit and information on a reproduction position of the moving image to the registered mobile information terminal, using the communication unit, to thereby cause the mobile information terminal to reproduce and display the moving image from the reproduction position of the moving image, and changing, based on changed information of the reproduction position of the moving image, which is received via the communication unit from the registered mobile information terminal, the reproduction position of the moving image being reproduced and displayed on the display unit.

In a fourth aspect of the present invention, there is provided a method of controlling an image processing apparatus including a communication unit that performs wireless connection with a plurality of mobile information terminals, a display unit that reproduces and displays a moving image, and an operation unit that is capable of changing a reproduction position of the moving image, comprising registering the plurality of mobile information terminals as distribution destinations of the moving image, distributing the moving image for current reproduction and display on the display unit and information on a reproduction position of the moving image to the plurality of registered mobile information terminals, using the communication unit, to thereby cause the plurality of mobile information terminals to each reproduce and display the moving image from the reproduction position of the moving image, and changing, based on changed information of the reproduction position of the moving image, which is received via the communication unit from any one of the plurality of registered mobile information terminals, the reproduction position of the moving image being reproduced and displayed on the display unit.

In a fifth aspect of the present invention, there is provided a non-transitory computer-readable storage medium storing a computer-executable program for causing a computer to execute a method of controlling an image processing apparatus including a communication unit that performs wireless connection with a mobile information terminal, a display unit that reproduces and displays a moving image, an operation unit that is capable of changing a reproduction position of the moving image, and the computer, wherein the method comprises registering the mobile information terminal as a distribution destination of the moving image, distributing the moving image for current reproduction and display on the display unit and information on a reproduction position of the moving image to the registered mobile information terminal, using the communication unit, to thereby cause the mobile information terminal to reproduce and display the moving image from the reproduction position of the moving image, and changing, based on changed information of the reproduction position of the moving image, which is received via the communication unit from the registered mobile information terminal, the reproduction position of the moving image being reproduced and displayed on the display unit.

In a sixth aspect of the present invention, there is provided a non-transitory computer-readable storage medium storing a computer-executable program for causing a computer to execute a method of controlling an image processing apparatus including a communication unit that performs wireless connection with a plurality of mobile information terminals, a display unit that reproduces and displays a moving image, an operation unit that is capable of changing a reproduction position of the moving image, and the computer, wherein the method comprises registering the plurality of mobile information terminals as distribution destinations of the moving image, distributing the moving image for current reproduction and display on the display unit and information on a reproduction position of the moving image to the plurality of registered mobile information terminals, using the communication unit, to thereby cause the plurality of mobile information terminals to each reproduce and display the moving image from the reproduction position of the moving image, and changing, based on changed information of the reproduction position of the moving image, which is received via the communication unit from any one of the plurality of registered mobile information terminals, the reproduction position of the moving image being reproduced and displayed on the display unit.

According to the present invention, it is possible to facilitate synchronization of maintenance moving image between the image processing apparatus and the mobile information terminal, thereby making it possible to more efficiently show the maintenance moving image to a user who performs a maintenance operation.

Further features of the present invention will become apparent from the following description of exemplary embodiments (with reference to the attached drawings).

BRIEF DESCRIPTION OF THE DRAWINGS

FIG. 3 is a block diagram showing the hardware configuration of a terminal shown in FIG. 1.

FIG. 4 is a block diagram showing the software configuration of the image processing apparatus.

FIGS. 9A and 9B are a sequence diagram showing a flow of synchronization control of maintenance moving image, according to a third embodiment of the present invention.

FIGS. 10A and 10B are a sequence diagram showing a flow of synchronization control of maintenance moving image, according to a fourth embodiment of the present invention.

DESCRIPTION OF THE EMBODIMENTS

The present invention will now be described in detail below with reference to the accompanying drawings showing embodiments thereof.

Figure 1:
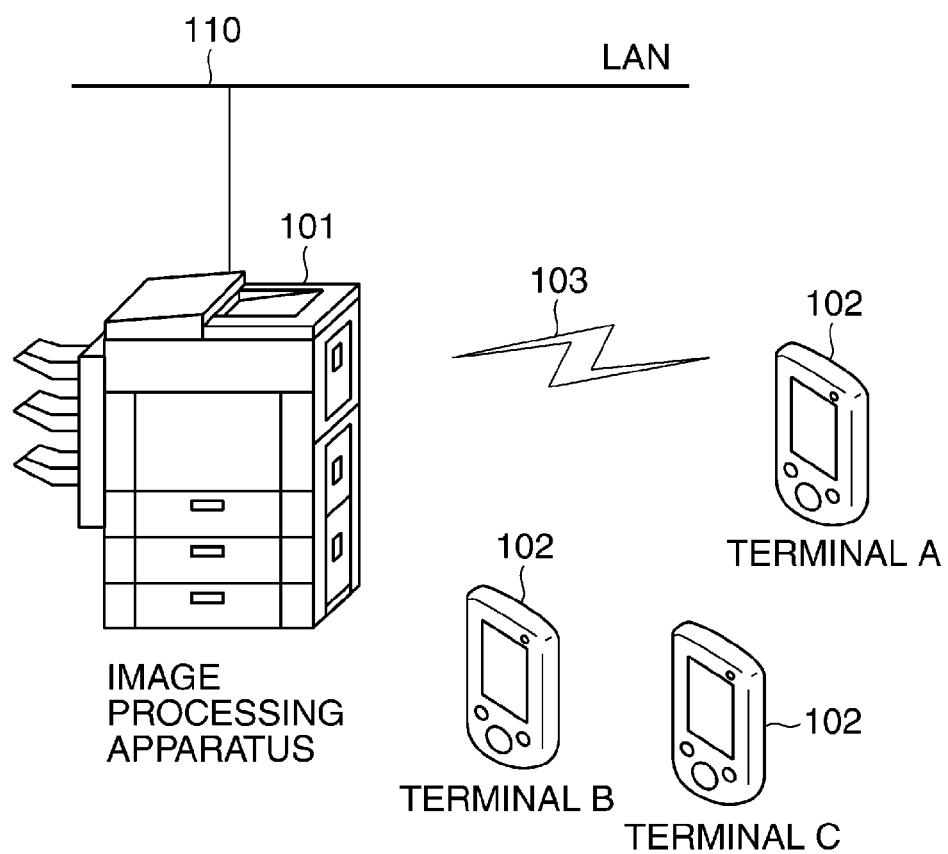
FIG. 1 is a schematic diagram of an image processing system including an image processing apparatus according to a first embodiment of the present invention.

FIG. 1 shows the configuration of an image processing system including an image processing apparatus according to a first embodiment of the present invention.

Referring to FIG. 1, the image processing apparatus 101 is a multifunction peripheral equipped with a plurality of functions, such as a copy function, a printer function, and a facsimile function, and is capable of communicating with external apparatuses via a LAN 110 using a predetermined protocol.

A terminal A 102 is a mobile information terminal wirelessly connectable to the image processing apparatus 101 via a wireless network 103. The mobile information terminal includes a PDA (Personal Digital Assistant), a mobile phone, and a tablet type information processing terminal. Note that similarly to the terminal A 102, a terminal B 102, and a terminal C 102 are also wirelessly connectable to the image processing apparatus 101.

The image processing apparatus 101 is capable of distributing a moving image and the like by having itself wirelessly connected to a mobile information terminal registered as a distribution destination of the moving image via the wireless network 103. Note that the communication protocol for connecting the image processing apparatus 101 and the LAN 110, and the communication protocol of the wireless network 103 may be any applicable protocol.

Figure 2:
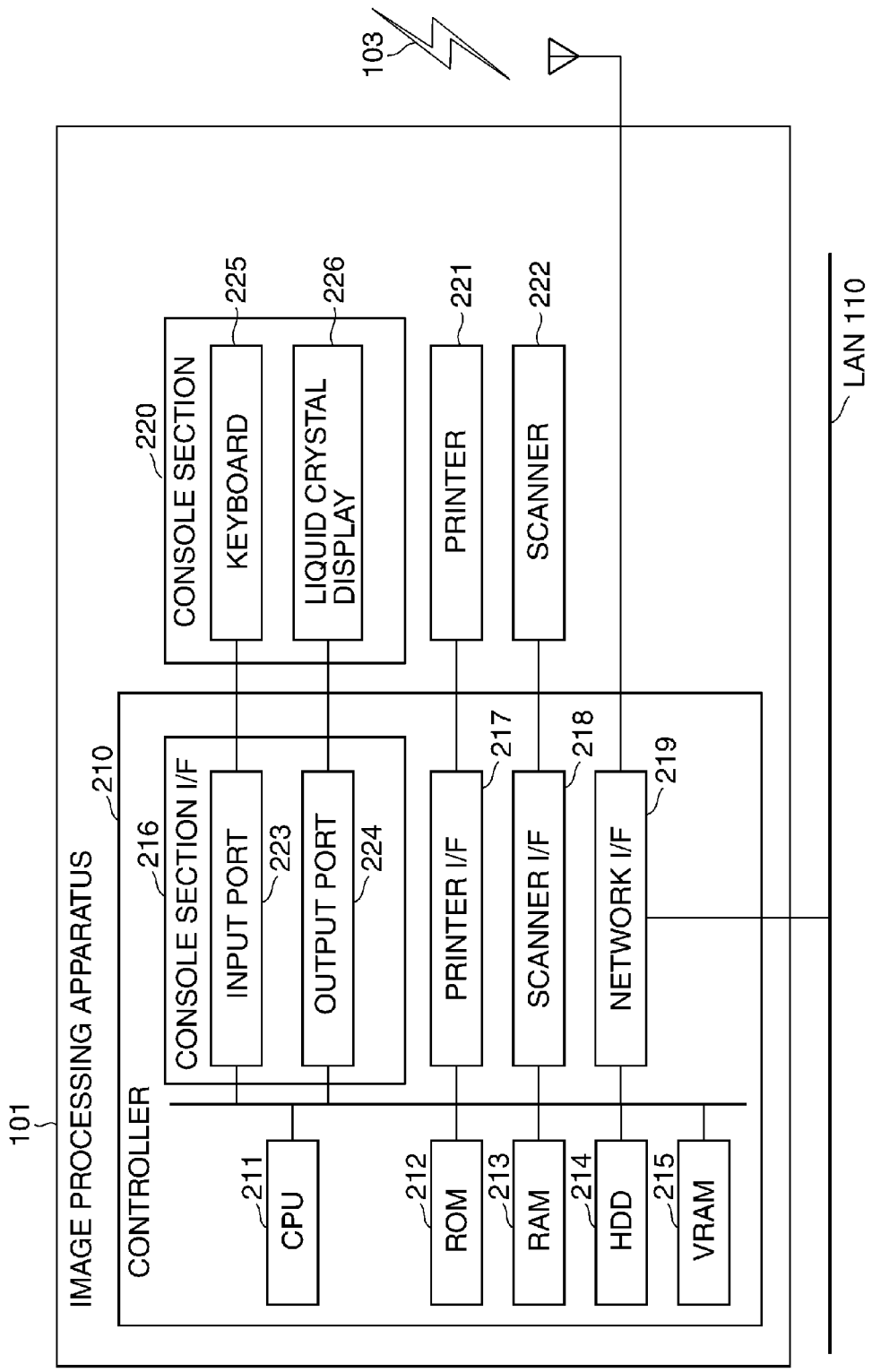
FIG. 2 is a block diagram showing the hardware configuration of the image processing apparatus shown in FIG. 1.

FIG. 2 is a block diagram showing the hardware configuration of the image processing apparatus 101 shown in FIG. 1.

The overall operation of the image processing apparatus 101 is controlled by a controller 210 including a CPU 211, a ROM 212, a RAM 213, an HDD 214, a VRAM (video RAM) 215, a console section interface 216, a printer interface 217, a scanner interface 218, and a network interface 219.

The CPU 211 reads out a control program stored in the ROM 212 and executes an associated one of various control processes, such as a read control process and a transmission control process. The RAM 213 is used as a main memory and a temporary storage area, such as a work area, of the CPU 211. The HDD 214 stores image data, various programs, and various information tables. The VRAM 215 stores display screen data generated by the CPU 211.

The console section interface 216 is a connection interface between a console section 220 and the controller 210, and is provided with an input port 223 and an output port 224. The console section 220 includes a liquid crystal display 226 equipped with a touch panel function, a keyboard 225, and so forth. When a user operation is received via the keyboard 225, information on the operation is input to the input port 223 of the console section interface 216. The CPU 211 generates display image data based on the information on the operation input via the console section interface 216 and a control program read out from the ROM 212 or the HDD 214, and temporarily stores the generated display screen data in the VRAM 215.

The printer interface 217 is a connection interface between a printer 221 and the controller 210. When the CPU 211 transfers image data to be printed to the printer 221 via the printer interface 217, the printer 221 prints the image data on a recording sheet.

The scanner interface 218 is a connection interface between a scanner 222 and the controller 210. The scanner 222 generates image data by reading an image on an original, and inputs the generated image data to the controller 210 via the scanner interface 218.

The network interface 219 is a connection interface between the controller 210 and the LAN 110. The network interface 219 transmits and receives various data to and from external apparatuses (not shown) on the LAN 110. Further, the network interface 219 is capable of transmitting image data and moving image data to the terminal A 102 connected to the wireless network 103 via an antenna.

FIG. 3 is a block diagram showing the hardware configuration of the terminal A 102 appearing in FIG. 1.

A controller 310 including a CPU 311 controls the overall operation of the terminal A 102. The CPU 311 reads out a control program stored in a ROM 312 and executes an associated one of various control processes. A RAM 313 is used as a main memory and a temporary storage area, such as a work area, of the CPU 311. An HDD 314 stores image data, various programs, and various information tables, referred to hereinafter.

A network interface 315 is a connection interface between the controller 310 and the wireless network 103, for use in communication between the terminal A 102 and the image processing apparatus 101. The controller 310 transmits and receives image data, moving image data, and various kinds of information between the controller 310 and the image processing apparatus 101 connected to the wireless network 103 via the network interface 219.

A display section 316 is capable of displaying the operating status of the terminal A 102 and various kinds of information, and reproducing moving image data. An operating section 317 comprises keys, buttons, and so forth, none of which are shown. Note that the display section 316 and the operating section 317 may be integrally formed with each other, as in the case of a touch panel.

FIG. 4 is a block diagram showing the software configuration of the image processing apparatus 101. The functional sections of the illustrated image processing apparatus 101 are realized by the CPU 211 executing a control program read out from the ROM 212 or the HDD 214.

The image processing apparatus 101 comprises an external communication section 401, an moving image data management section 402, a consumables detection section 403, a screen image-rendering section 404, a job management section 405, a jam detection section 406, a history management section 407, and a communication data management section 408.

To distribute moving image data e.g. to the terminal A 102, the external communication section 401 communicates with the terminal A 102 via the wireless network 103. The moving image data management section 402 stores moving image data in the RAM 213 or the HDD 214, and manages the stored moving image data. The consumables detection section 403 detects the remaining amount of consumables in the image processing apparatus 101. The consumables refer to toner, staples, sheets, and so forth. Further, the consumables detection section 403 also detects the amount of waste, such as punch chips and waste toner, accumulated in the image processing apparatus 101.

The screen image-rendering section 404 generates and displays a screen to be displayed on the console section 220. Further, the screen image-rendering section 404 displays maintenance moving image managed by the moving image data management section 402 on the console section 220, for playback (reproduction).

The job management section 405 stores job information in the RAM 213 or the HDD 214, and manages the job information. The job information includes job settings of a job currently being processed, such as a start time, a job type, a document name, the number of sheets, the number of copies, and the stapling execution or non-execution. The job type indicates a type of a job, such as copy, print, transmission, or storage, which is to be performed by the image processing apparatus 101.

The jam detection section 406 identifies a location in the image processing apparatus 101 where a jam has occurred, and sets a jam occurrence flag for the location. The history management section 407 stores a type of maintenance, a time point when the maintenance was required, a time point when the maintenance was completed, etc., in the RAM 213 or the HDD 214, and manages the information items. Further, the history management section 407 receives information items, such as the location where the jam occurred, a time when the jam occurred, a time when the jam was removed, from the jam detection section 406, and manages the information items, as a jam occurrence history. The communication data management section 408 stores apparatus information of the terminal A 102 with which the external communication section 401 communicates, and manages the apparatus information.

Next, with reference to FIG. 5, a description will be given of a series of processes in which the image processing apparatus 101 distributes maintenance moving image to the terminal A 102, and the image processing apparatus 101 and the terminal A 102 cooperate to perform synchronization of the maintenance moving image.

Figure 5:
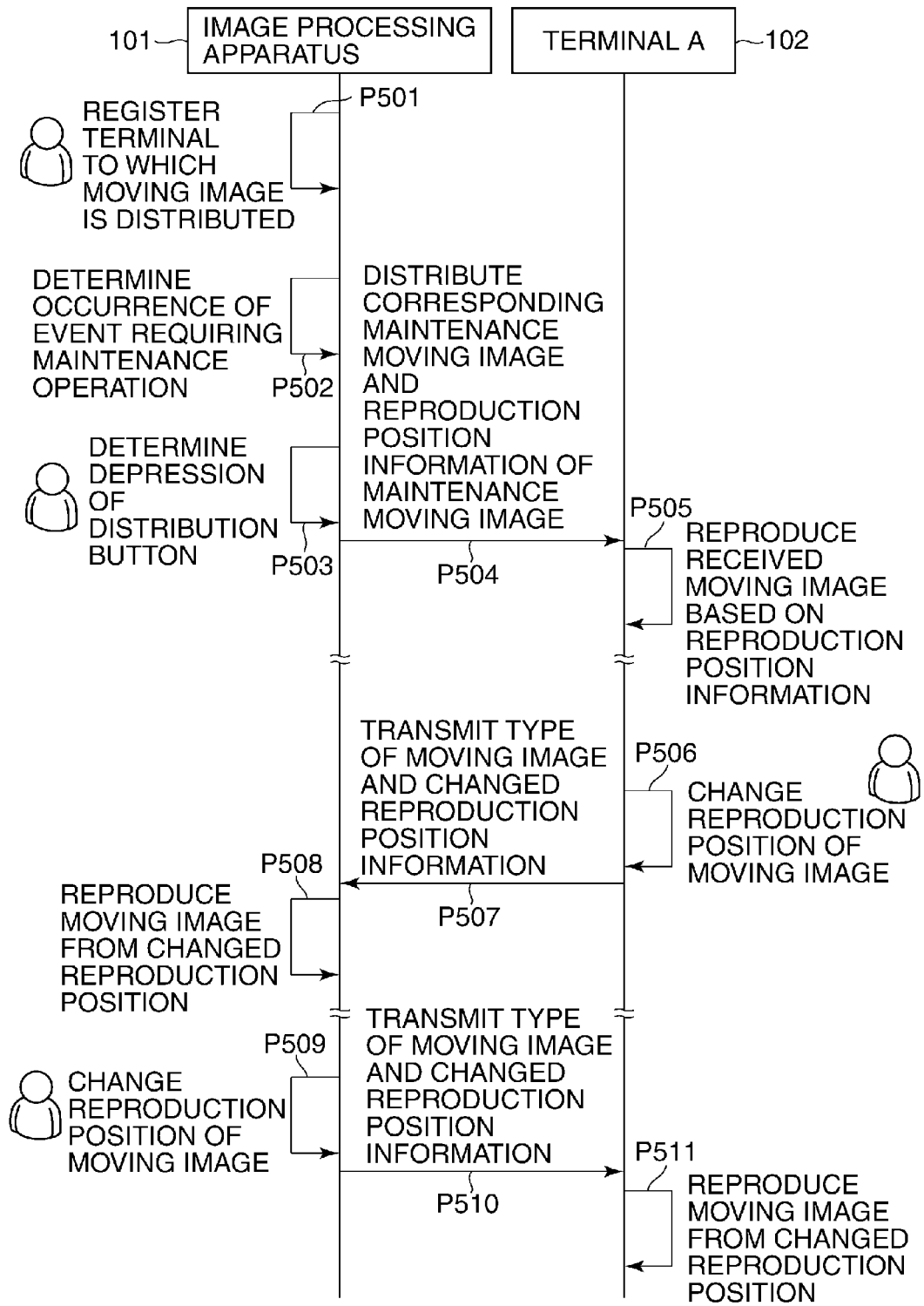
FIG. 5 is a sequence diagram showing a flow of synchronization control of maintenance moving image, performed between the image processing apparatus and the terminal.

FIG. 5 is a sequence diagram showing a flow of synchronization control of maintenance moving image, which is performed between the image processing apparatus 101 and the terminal A 102. Respective processes shown in FIG. 5 are realized by the CPU 211 of the image processing apparatus 101 and the CPU 311 of the terminal A 102, which execute associated control programs, respectively.

First, a description will be given of distribution of maintenance moving image from the image processing apparatus 101 to the terminal A 102.

In a process P501, the image processing apparatus 101 registers a terminal to which maintenance moving image is distributed. In the present embodiment, the terminal A 102 is registered, by way of example. At this time, the communication data management section 408 stores the apparatus information of the terminal A 102 input to the console section 220 by a user in the RAM 213 or the HDD 214. The apparatus information of the terminal A 102 includes an identification ID of the terminal A 102, for example.

In a process P502, the image processing apparatus 101 determines occurrence of an event requiring a maintenance operation. Specifically, the consumables detection section 403 and the jam detection section 406 determine whether or not an event requiring a maintenance operation has occurred. Examples of the event requiring a maintenance operation include shortage of the remaining amount of consumables, detected by the consumables detection section 403, and occurrence of a jam detected by the jam detection section 406. If it is determined that an event requiring a maintenance operation has occurred, the screen image-rendering section 404 reproduces and displays maintenance moving image stored in the RAM 213 or the HDD 214 on the console section 220. Although in the illustrated example, the reproduction and display of maintenance moving image is performed when it is determined that an event requiring a maintenance operation has occurred, the image processing apparatus 101 may be configured such that the maintenance moving image is reproduced upon receipt of a predetermined user operation after a warning indicative of such an event is displayed.

In a process P503, the image processing apparatus 101 determines depression of a distribution button. In the illustrated example, the image processing apparatus 101 determines whether or not the distribution button (not shown) on the console section 220 has been depressed by the user. If the distribution button has been depressed, the image processing apparatus 101 proceeds to a process P504.

In the process P504, the image processing apparatus 101 distributes maintenance moving image associated with the event requiring the maintenance operation and reproduction position information of the maintenance moving image to the terminal A 102. In the illustrated example, the external communication section 401 distributes maintenance moving image for current reproduction which is stored in the RAM 213 or the HDD 214, and information on a reproduction position of the maintenance moving image at the time point of depression of the distribution button, to the registered terminal A 102.

In a process P505, the terminal A 102 downloads (receives) the maintenance moving image and the reproduction position information distributed from the image processing apparatus 101 through the network interface 315. Then, the terminal A 102 reproduces and displays the distributed maintenance moving image on the display section 316 from the reproduction position acquired from the distributed reproduction position information.

Next, a description will be given of maintenance moving image synchronization control (an example of first synchronization control) performed between the image processing apparatus 101 and the terminal A 102 when the reproduction position of the maintenance moving image being reproduced and displayed on the terminal A 102 is changed.

In a process P506, when the reproduction position of the maintenance moving image being reproduced and displayed on the display section 316 is changed by the user, the terminal A 102 proceeds to a process P507.

In the process P507, the terminal A 102 transmits the type of the maintenance moving image and information on the changed reproduction position thereof (changed information) to the image processing apparatus 101. Note that the phrase "the reproduction position of the maintenance moving image is changed by the user" is intended to mean that due to execution of fast forward or rewind, for example, of the maintenance moving image, the reproduction position of the maintenance moving image becomes different from a position where the reproduction would be if the fast forward or the rewind of the maintenance moving image were not performed.

In a process P508, the image processing apparatus 101 reproduces the maintenance moving image from the changed reproduction position. Specifically, when the external communication section 401 receives the type of the maintenance moving image and the information on the changed reproduction position thereof (changed information) from the terminal A 102, the screen image-rendering section 404 reproduces and displays a corresponding type of maintenance moving image from the changed reproduction position on the liquid crystal display 226.

Next, a description will be given of maintenance moving image synchronization control (an example of second synchronization control) performed between the image processing apparatus 101 and the terminal A 102 when the reproduction position of the maintenance moving image being reproduced and displayed on the image processing apparatus 101 is changed.

In a process P509, when the reproduction position of the maintenance moving image being reproduced and displayed on the liquid crystal display 226 is changed by the user, the image processing apparatus 101 proceeds to a process P510.

In the process P510, the image processing apparatus 101 transmits the type of the maintenance moving image and information on the changed reproduction position thereof (changed information) to the terminal A 102. Specifically, the external communication section 401 transmits the type of the maintenance moving image and information on the changed reproduction position thereof (changed information) to the terminal A 102.

In a process P511, the terminal A 102 downloads the type of the maintenance moving image and the information on the changed reproduction position thereof (changed information) transmitted from the image processing apparatus 101, and reproduces and displays a corresponding type of maintenance moving image from the changed reproduction position on the display section 316.

Note that although in the present embodiment, the terminal A 102 reproduces and displays maintenance moving image after once downloading a maintenance moving image from the image processing apparatus 101, it is to be understood that the terminal A 102 is capable of reproducing and displaying maintenance moving image in the same manner also when image data is subjected to streaming distribution.

Figure 6:
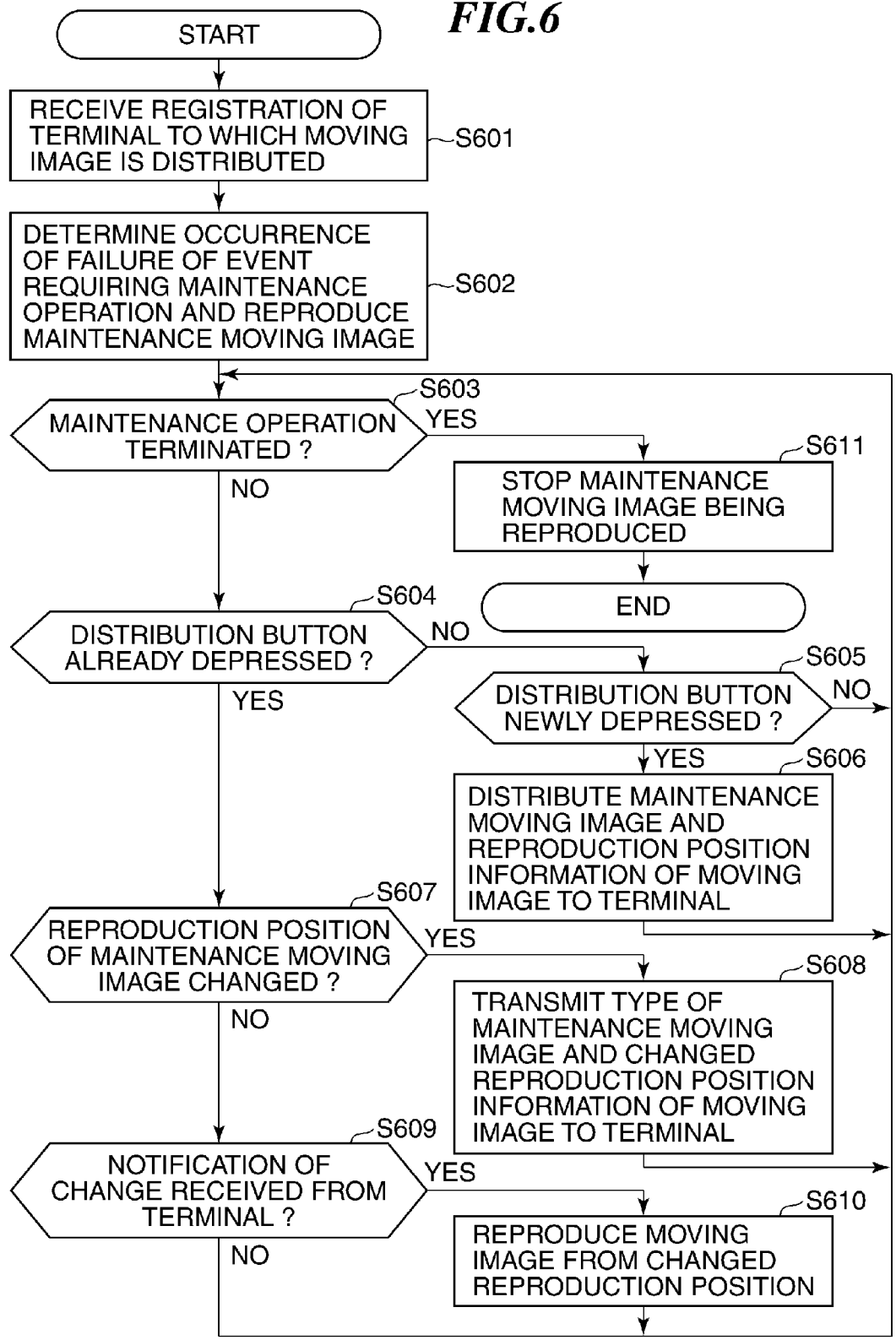
FIG. 6 is a flowchart of a maintenance moving image synchronization process between the image processing apparatus and the terminal, which is performed by the image processing apparatus.

FIG. 6 is a flowchart of a maintenance moving image synchronization process between the image processing apparatus 101 and the terminal A 102, which is performed by the image processing apparatus 101. Steps shown in FIG. 6 are realized by the CPU 211 of the image processing apparatus 101 executing a control program therefor.

In a step S601, the CPU 211 receives from the console section 220 registration of the terminal A 102 to which maintenance moving image is to be distributed. The information received from the console section 220 is stored in the RAM 213 or the HDD 214 as the apparatus information of the terminal A 102 by the communication data management section 408. The following steps are also executed by the CPU 211 causing the associated sections of the software shown in FIG. 4 to operate.

In a step S602, the consumables detection section 403 and the jam detection section 406 determine whether or not an event requiring a maintenance operation has occurred. As described hereinabove, examples of the event requiring a maintenance operation include shortage of the remaining amount of consumables, detected by the consumables detection section 403, and occurrence of a jam detected by the jam detection section 406. If it is determined that an event requiring a maintenance operation has occurred, the screen image-rendering section 404 reproduces and displays maintenance moving image stored in the RAM 213 or the HDD 214 on the console section 220. Although in the illustrated example, the reproduction and display of maintenance moving image is performed when it is determined that an event requiring a maintenance operation has occurred, the image processing apparatus 101 may be configured such that the maintenance moving image is reproduced upon receipt of a predetermined user operation after a warning indicative of such an event is displayed.

In a step S603, the consumables detection section 403 and the jam detection section 406 determine whether or not the maintenance operation has been terminated. For example, although this determination may be performed based e.g. on whether or not a maintenance operation-terminating instruction has been given by the user using the console section 220, or whether or not consumables has been replenished, this is not limitative. If it is determined in the step S603 that the event requiring the maintenance operation has not been terminated, the process proceeds to a step S604.

On the other hand, if it is determined that the event requiring the maintenance operation has been terminated, the screen image-rendering section 404 stops the maintenance moving image which is being reproduced and displayed on the liquid crystal display 226 (step S611), followed by terminating the present process.

In the step S604, the screen image-rendering section 404 and the moving image data management section 402 determine whether or not the distribution button on the console section 220 has already been depressed. If it is determined that the distribution button has not been depressed yet, the process proceeds to a step S605, whereas if it is determined that the distribution button has already been depressed, the process proceeds to a step S607.

In the step S605, the screen image-rendering section 404 determines whether or not the distribution button has been newly depressed. If it is determined that the distribution button has been newly depressed, the process proceeds to a step S606, whereas if it is determined that the distribution button has not been newly depressed, the process returns to the step S603.

In the step S606, the external communication section 401 distributes maintenance moving image for current reproduction, which is stored in the RAM 213 or the HDD 214, and information on a reproduction position of the maintenance moving image at a time point of depression of the distribution button, to the registered terminal A 102. Then, the process returns to the step S603.

In the step S607, the screen image-rendering section 404 determines whether or not the reproduction position of the maintenance moving image being reproduced and displayed on the liquid crystal display 226 has been changed. If it is determined that the reproduction position has been changed, the process returns to a step S608, whereas if it is determined that the reproduction position has not been changed, the process proceeds to a step S609.

In the step S608, the external communication section 401 transmits the type of the maintenance moving image and information on the changed reproduction position thereof to the terminal A 102, and then the process returns to the step S603.

In the step S609, the external communication section 401 determines whether or not a notification of the change in the reproduction position has been received from the terminal A 102. The notification of the change in the reproduction position includes e.g. reception of the type of the maintenance moving image and information on the changed reproduction position thereof, from the terminal A 102. If it is determined that the notification of the change in the reproduction position has been received, the process proceeds to a step S610, whereas it is determined that the notification of the change in the reproduction position has not been received, the process returns to the step S603.

After the external communication section 401 has received the type of the maintenance moving image and the information on the changed reproduction position thereof, from the terminal A 102, in the step S610, the screen image-rendering section 404 reproduces and displays the corresponding type of maintenance moving image from the changed reproduction position on the liquid crystal display 226. Then, the process returns to the step S603.

Figure 7:
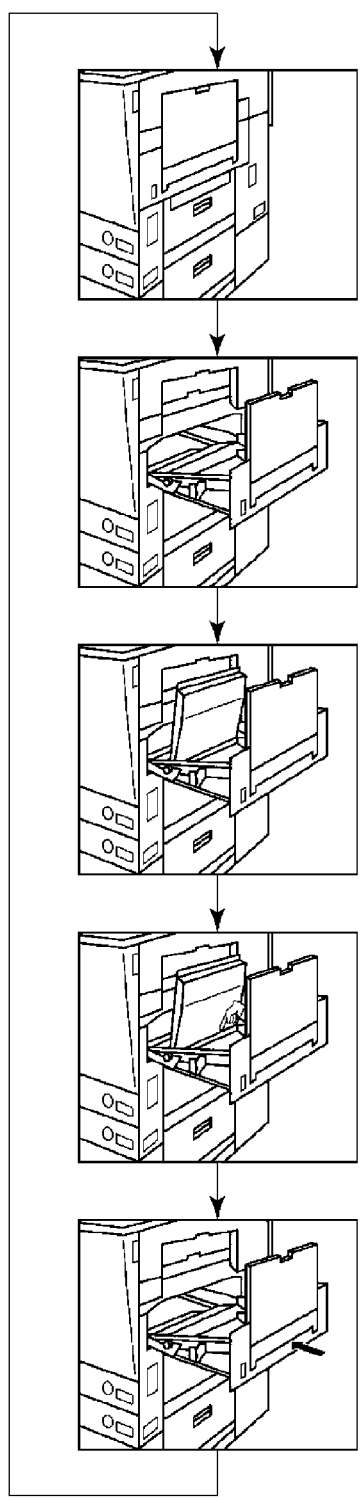
FIG. 7 is a view showing an example of reproduction and display of a maintenance moving image which is displayed on the image processing apparatus or the terminal.

FIG. 7 is a view showing an example of reproduction and display of maintenance moving image displayed on the image processing apparatus 101 or the terminal A 102. The maintenance moving image is endlessly reproduced.

According to the above-described first embodiment, the image processing apparatus registers a mobile information terminal as a distribution destination of a moving image; distributes information on the moving image for current reproduction and display on the image processing apparatus and a reproduction position of the moving image, to the registered mobile information terminal; and causes the mobile information terminal to reproduce and display the moving image from the reproduction position of the moving image. Further, the image processing apparatus changes the reproduction position of the moving image currently being reproduced and displayed on the same based on information of a change in the reproduction position of the moving image, received from the registered mobile information terminal. On the other hand, when the reproduction position of the moving image currently being reproduced and displayed is changed on the image processing apparatus, the image processing apparatus transmits information on the changed reproduction position of the maintenance moving image to the registered mobile information terminal, and causes the mobile information terminal to change the reproduction position of the moving image currently being reproduced and displayed on the mobile information terminal. This makes it possible to facilitate synchronization of the maintenance moving image between the image processing apparatus and the mobile information terminal, thereby making it possible to more efficiently show the maintenance moving image to the user who performs a maintenance operation.

Next, a second embodiment of the present invention will be described.

In the second embodiment, a description will be given of a case where maintenance moving image is synchronized by taking a change in the maintenance state of an image processing apparatus into account. The second embodiment has the same configurations as those of the above-described first embodiment shown in FIGS. 1 to 4. Therefore, the same components and elements as those of the first embodiment are denoted by the same reference numerals, and description thereof is omitted. In the following, a description will be given only of different points from the first embodiment.

Figure 8:
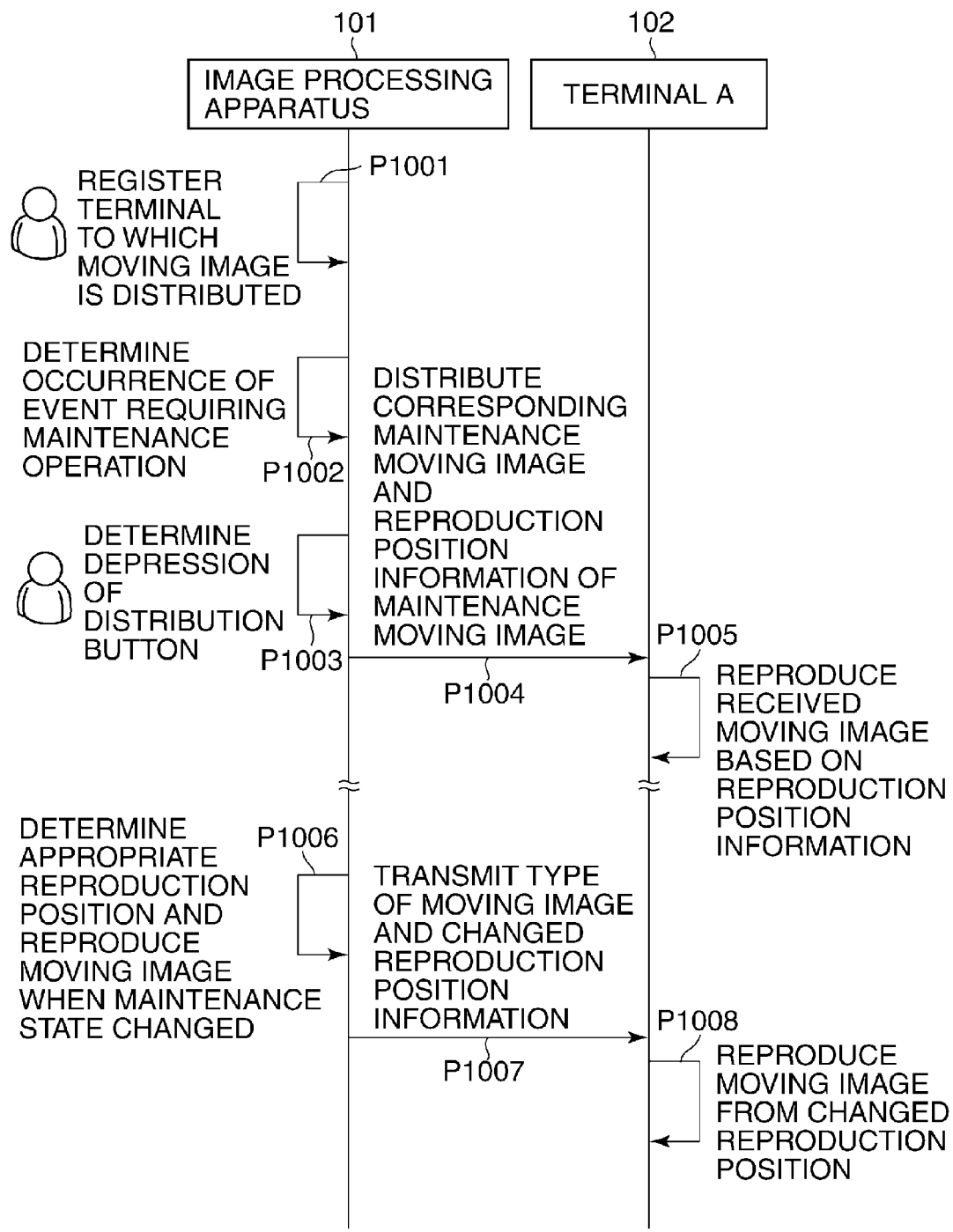
FIG. 8 is a sequence diagram showing a flow of synchronization control of a maintenance moving image, according to a second embodiment of the present invention.

With reference to FIG. 8, a description will be given of a series of processes in which maintenance moving image is synchronized between the image processing apparatus 101 and the terminal A 102 by taking a change in the maintenance state of the image processing apparatus into account.

FIG. 8 is a sequence diagram showing a flow of synchronization control of maintenance moving image, according to the second embodiment. Respective processes shown in FIG. 8 are realized by the CPU 211 of the image processing apparatus 101 and the CPU 311 of the terminal A 102, which execute associated control programs, respectively. Note that processes P1001 to P1005 illustrated in FIG. 8 are the same as the processes P501 to P505 illustrated in FIG. 5, and hence description thereof is omitted.

In a process P1006, the moving image data management section 402 determines an appropriate reproduction position of the maintenance moving image based on the maintenance state of the image processing apparatus 101. For example, in a case where the consumables detection section 403 has detected replenishment of consumables, the moving image data management section 402 changes the reproduction position of the maintenance moving image to a chapter in which an operation required after the replenishment of the consumables is recorded. Also, in a case where the user has removed a jam, the moving image data management section 402 changes the reproduction position of the maintenance moving image to a chapter in which an operation required after the removal of the jam is recorded. Then, the screen image-rendering section 404 reproduces and displays the maintenance moving image on the liquid crystal display 226 from the reproduction position set after the change, and the process proceeds to a process P1007.

In the process P1007, the external communication section 401 transmits the type of the maintenance moving image and information on the changed reproduction position thereof (changed information) to the terminal A 102.

In a process P1008, the terminal A 102 receives the type of the maintenance moving image and the information on the changed reproduction position thereof (changed information) transmitted from the image processing apparatus 101, and reproduces and displays the corresponding type of maintenance moving image from the changed reproduction position.

According to the above-described second embodiment, in addition to operations of the first embodiment, the maintenance moving image is synchronized by taking a change in the maintenance state of the image processing apparatus into account, whereby is made possible to more efficiently show the maintenance moving image to the user who performs a maintenance operation.

Next, a third embodiment of the present invention will be described.

In the third embodiment, a description will be given of a case where a maintenance moving image is synchronized between the image processing apparatus 101 and a plurality of terminals A to C 102, starting from the image processing apparatus 101. The third embodiment has the same configurations as those of the above-described first embodiment shown in FIGS. 1 to 4. Therefore, the same components and elements as those of the first embodiment are denoted by the same reference numerals, and description thereof is omitted. In the following, a description will be given only of different points from the first embodiment.

With reference to FIGS. 9A and 9B, a description will be given of a series of processes in which maintenance moving image is synchronized between the image processing apparatus 101 and the terminals A to C 102, starting from the image processing apparatus 101.

FIGS. 9A and 9B are a sequence diagram showing a flow of synchronization control of a maintenance moving image, according to the third embodiment. Respective processes shown in FIGS. 9A and 9B are realized by the CPU 211 of the image processing apparatus 101 and the CPU 311 of the terminal A to C 102, which execute associated control programs, respectively. Note that processes P802 and P803 illustrated in FIG. 9A are the same as the respective processes P502 and P503 illustrated in FIG. 5, and description thereof is omitted. Further, although in the present embodiment, a description is given of a case where the reproduction position of maintenance moving image being reproduced and displayed on the terminal A 102 is changed, the same processing is performed in a case where the reproduction position of maintenance moving image being reproduced and displayed on either of the B 102 and the terminal C 102 is changed, as well.

First, a description will be given of distribution of a maintenance moving image from the image processing apparatus 101 to the terminals A to C 102.

In a process P801, the communication data management section 408 stores the apparatus information of the terminals A to C 102, input by the user to the console section 220, in the RAM 213 or the HDD 214. The apparatus information of the terminals A to C 102 includes the identification IDs of the terminals A to C 102, for example.

In a process P804, the image processing apparatus 101 distributes a maintenance moving image for current reproduction, which is stored in the RAM 213 or the HDD 214, and information on a reproduction position of the maintenance moving image at a time point of depression of the distribution button, to the registered terminals A 102 to the terminal C 102.

In a process P805, the terminals A to C 102 download the maintenance moving image and the reproduction position information distributed from the image processing apparatus 101, using the network interface 315. Then, the terminals A to C 102 reproduce and display the distributed maintenance moving image on the display section 316 from a reproduction position acquired from the distributed reproduction position information.

Next, a description will be given of maintenance moving image synchronization control (an example of first synchronization control) performed between the image processing apparatus 101 and the terminals B and C 102, when the reproduction position of the maintenance moving image being reproduced and displayed on the terminal A 102 is changed.

In a process P806, when the reproduction position of the maintenance moving image being reproduced and displayed on the display section 316 is changed by the user, the terminal A 102 proceeds to a process P807.

In the process P807, the terminal A 102 transmits the type of the maintenance moving image and information on the changed reproduction position thereof to the image processing apparatus 101.

In a process P808, the image processing apparatus 101 downloads the type of the maintenance moving image and the information on the changed reproduction position thereof transmitted from the terminal A 102. Then, the image processing apparatus 101 transmits (transfers) the type of the maintenance moving image and the information on the changed reproduction position thereof (changed information) to the terminals B and C 102 other than the mobile information terminal in which the reproduction position of the maintenance moving image has been changed, out of the terminals A to C 102 registered in the process P801.

In a process P809, the terminals B and C 102 download the type of the maintenance moving image and the information on the changed reproduction position thereof (changed information) transmitted from the image processing apparatus 101, and reproduce and display the corresponding type of maintenance moving image from the changed reproduction position. On the other hand, the image processing apparatus 101 reproduces and displays the corresponding type of maintenance moving image from the changed reproduction position on the liquid crystal display 226.

Next, a description will be given of maintenance moving image synchronization control (an example of second synchronization control) performed between the image processing apparatus 101 and the terminals A to C 102 when the reproduction position of the maintenance moving image being reproduced and displayed on the image processing apparatus 101 is changed.

In a process P810, when the reproduction position of the maintenance moving image being reproduced and displayed on the liquid crystal display 226 is changed by the user, the image processing apparatus 101 proceeds to a process 811.

In the process P811, the image processing apparatus 101 distributes the type of the maintenance moving image and information on the changed reproduction position thereof (changed information) to the terminals A to C 102 registered in the process P801. Therefore, the information items are not distributed to any other terminal than the terminals registered in advance.

In a process P812, the terminals A to C 102 download the type of the maintenance moving image and the information on the changed reproduction position thereof (changed information) transmitted from the image processing apparatus 101, and reproduce and display the corresponding type of maintenance moving image from the changed reproduction position.

According to the above-described third embodiment, even when a plurality of users perform the maintenance operations of the image processing apparatus, it is possible to facilitate synchronization of the maintenance moving image between the image processing apparatus and the mobile information terminals, thereby making it possible to more efficiently show the maintenance moving image to the users who perform the maintenance operations.

Next, a fourth embodiment of the present invention will be described.

In the fourth embodiment, a description will be given of a case where maintenance moving image is synchronized between the image processing apparatus 101 and the terminals A to C 102, starting from one of the image processing apparatus 101 and the terminals A to C 102, in which the reproduction position of the maintenance moving image has been changed. Note that in the fourth embodiment, a description will be given only of different points from the first embodiment.

With reference to FIGS. 10A and 10B, a description will be given of maintenance moving image synchronization control (an example of the first synchronization control) performed between the image processing apparatus 101 and the plurality of terminals A to C 102, starting from a terminal in which the reproduction position of the maintenance moving image has been changed.

FIGS. 10A and 10B are a sequence diagram showing a flow of synchronization control of maintenance moving image, according to the fourth embodiment. Respective processes shown in FIGS. 10A and 10B are realized by the CPU 211 of the image processing apparatus 101 and the CPU 311 of the terminals A to C 102 by executing associated control programs, respectively. Note that processes P901 to P903 illustrated in FIG. 10A are the same as the respective processes P801 to P803 illustrated in FIG. 9A, and description thereof is omitted. Further, although in the present embodiment, a description is given of a case where the reproduction position of maintenance moving image being reproduced and displayed on the terminal A 102 is changed, the same processing is performed in a case where the reproduction position of maintenance moving image being reproduced and displayed on either of the B 102 and the terminal C 102 is changed, as well.

In a process P904, the image processing apparatus 101 distributes maintenance moving image for current reproduction, which is stored in the RAM 213 or the HDD 214, and information on a reproduction position of the maintenance moving image at a time point of depression of the distribution button, to the registered terminals A 102 to the terminal C 102. Further, the image processing apparatus 101 distributes the apparatus information of the image processing apparatus 101 and the apparatus information of the terminals A to C 102 registered in the process P901 to the terminals A to C 102.

In a process P905, the terminals A to C 102 download the maintenance moving image and the reproduction position information distributed from the image processing apparatus 101, using the network interface 315. Then, the terminals A to C 102 reproduce and display the distributed maintenance moving image on the display section 316 from the reproduction position acquired from the distributed reproduction position information. Further, the terminals A to C 102 store the apparatus information of the image processing apparatus 101 and the apparatus information of the terminals A to C 102 in the RAM 313 or the HDD 314.

In a process P906, when the reproduction position of the maintenance moving image being reproduced and displayed on the display section 316 is changed by the user, the terminal A 102 proceeds to a process P907.

In the process P907, the terminal A 102 refers to the stored apparatus information of the image processing apparatus 101 and the terminals A to C 102. Then, the terminal A 102 transmits the type of the maintenance moving image and information on the changed reproduction position thereof (changed information) to the image processing apparatus 101 and the terminals B and C 102 other than the terminal A 102.

In a process P908, the terminals B and C 102 and the image processing apparatus 101 download the type of the maintenance moving image and the information on the changed reproduction position thereof (changed information) transmitted from the terminal A 102, and reproduce and display the corresponding type of maintenance moving image from the changed reproduction position.

According to the above-described fourth embodiment, similarly to the third embodiment, even when a plurality of users perform the maintenance operations of the image processing apparatus, it is possible to facilitate synchronization of the maintenance moving image between the image processing apparatus and the mobile information terminals, thereby making it possible to more efficiently show the maintenance moving image to the users who perform the maintenance operations.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2012-003173 filed Jan. 11, 2012, which is hereby incorporated by reference herein in its entirety.

What is claimed is:

1. An image processing apparatus comprising:
   a communication unit configured to perform wireless connection with a mobile information terminal;
   a display unit configured to reproduce and display a moving image;
   a distribution unit configured to distribute the moving image being reproduced and displayed on the display unit and to distribute information on a reproduction position of the moving image to the mobile information terminal, using the communication unit, to thereby cause the mobile information terminal to reproduce and display the moving image from the reproduction position of the moving image; and
   a first synchronization control unit configured to change, based on changed information of the reproduction position of the moving image, which is received via the communication unit from the mobile information terminal, the reproduction position of the moving image being reproduced and displayed on the display unit.

2. The image processing apparatus according to claim 1, further comprising:
   an operation unit configured to change a reproduction position of the moving image; and
   a second synchronization control unit configured to transmit, when the reproduction position of the moving image being reproduced and displayed on the display unit is changed by the operation unit, transmit changed information of the reproduction position of the moving image to the mobile information terminal using the communication unit, to thereby cause the mobile information terminal to change the reproduction position of the moving image being reproduced and displayed thereon.

3. The image processing apparatus according to claim 2, further comprising a changing unit configured to change the reproduction position of the moving image being reproduced and displayed on the display unit, according to a state of a maintenance operation performed on the image processing apparatus, and
   wherein when the reproduction position of the moving image is changed by said changing unit, said second synchronization control unit transmits the changed information of the reproduction position of the moving image to the mobile information terminal, using the communication unit, to thereby cause the mobile information terminal to change the reproduction position of the moving image being reproduced and displayed on the mobile information terminal.

4. An image processing apparatus comprising:
   a communication unit configured to perform wireless connection with a plurality of mobile information terminals;
   a display unit configured to reproduce and display a moving image;
   an operation unit configured to change a reproduction position of the moving image;
   a distribution unit configured to distribute the moving image being reproduced and displayed on the display unit and to distribute information on a reproduction position of the moving image to the plurality of mobile information terminals, using the communication unit, to thereby cause the plurality of mobile information terminals to each reproduce and display the moving image from the reproduction position of the moving image; and
   a synchronization control unit configured to change, based on changed information of the reproduction position of the moving image, which is received via the communication unit from any one of the plurality of mobile information terminals, the reproduction position of the moving image being reproduced and displayed on the display unit, and transmit the information of the changed reproduction position to any of the plurality of mobile information terminals other than the one that has transmitted the information of the changed reproduction position.

5. A method of controlling an image processing apparatus including a communication unit that performs wireless connection with a mobile information terminal, a display unit that reproduces and displays a moving image, and an operation unit that is capable of changing a reproduction position of the moving image, comprising:
   distributing the moving image being reproduced and displayed on the display unit and distributing information on a reproduction position of the moving image to the mobile information terminal, using the communication unit, to thereby cause the mobile information terminal to reproduce and display the moving image from the reproduction position of the moving image; and changing, based on changed information of the reproduction position of the moving image, which is received via the communication unit from the mobile information terminal, the reproduction position of the moving image being reproduced and displayed on the display unit.

6. A method of controlling an image processing apparatus including a communication unit that performs wireless connection with a plurality of mobile information terminals, a display unit that reproduces and displays a moving image, and an operation unit that is capable of changing a reproduction position of the moving image, comprising:

distributing the moving image being reproduced and displayed on the display unit and distributing information on a reproduction position of the moving image to the plurality of mobile information terminals, using the communication unit, to thereby cause the plurality of mobile information terminals to each reproduce and display the moving image from the reproduction position of the moving image; and changing, based on changed information of the reproduction position of the moving image, which is received via the communication unit from any one of the plurality of mobile information terminals, the reproduction position of the moving image being reproduced and displayed on the display unit, and transmitting the information of the changed reproduction position to any of the plurality of mobile information terminals other than the one that has transmitted the information of the changed reproduction position.

7. A non-transitory computer-readable storage medium storing a computer-executable program for causing a computer to execute a method of controlling an image processing apparatus including a communication unit that performs wireless connection with a mobile information terminal, a display unit that reproduces and displays a moving image, an operation unit that is capable of changing a reproduction position of the moving image, and the computer, wherein the method comprises:

distributing the moving image being reproduced and displayed on the display unit and distributing information on a reproduction position of the moving image to the mobile information terminal, using the communication unit, to thereby cause the mobile information terminal to reproduce and display the moving image from the reproduction position of the moving image; and changing, based on changed information of the reproduction position of the moving image, which is received via the communication unit from the mobile information terminal, the reproduction position of the moving image being reproduced and displayed on the display unit.

8. A non-transitory computer-readable storage medium storing a computer-executable program for causing a computer to execute a method of controlling an image processing apparatus including a communication unit that performs wireless connection with a plurality of mobile information terminals, a display unit that reproduces and displays a moving image, an operation unit that is capable of changing a reproduction position of the moving image, and the computer, wherein the method comprises:

distributing the moving image being reproduced and displayed on the display unit and distributing information on a reproduction position of the moving image to the plurality of mobile information terminals, using the communication unit, to thereby cause the plurality of mobile information terminals to each reproduce and display the moving image from the reproduction position of the moving image; and changing, based on changed information of the reproduction position of the moving image, which is received via the communication unit from any one of the plurality of mobile information terminals, the reproduction position of the moving image being reproduced and displayed on the display unit, and transmitting the information of the changed reproduction position to any of the plurality of mobile information terminals other than the one that has transmitted the information of the changed reproduction position.

9. The image processing apparatus according to claim 1, further comprising a registration unit configured to register the mobile information terminal as a distribution destination of the moving image, wherein the distribution unit distributes the moving image being reproduced and displayed on the display unit and distributes information on the reproduction position of the moving image to the mobile information terminal registered by the registration unit.

10. The image processing apparatus according to claim 1, wherein the moving image reproduced and displayed on the display unit includes a movie image which shows a procedure of operations for a maintenance operation for the image processing apparatus.

11. The image processing apparatus according to claim 10, further comprising a detection unit configured to detect an occurrence of an event requiring the maintenance operation, wherein the display unit starts reproducing and displaying of the moving image in response to the detection unit detecting the occurrence of the event requiring the maintenance operation.

12. The image processing apparatus according to claim 11, wherein the detection unit detects an occurrence of a jam or a shortage of the remaining amount of consumables.

13. The image processing apparatus according to claim 1, further comprising:

a reading unit configured to read an image on an original to generate image data; and a printing unit configured to print the generated image data on a recording medium.

14. An image processing apparatus comprising:

a communication unit configured to perform wireless connection with a mobile information terminal;

a display unit configured to reproduce and display a moving image;

a distribution unit configured to distribute the moving image being reproduced and displayed on the display unit and to distribute information on a reproduction position of the moving image to the mobile information terminal, using the communication unit, to thereby cause the mobile information terminal to reproduce and display the moving image from the reproduction position of the moving image;

a changing unit configured to change the reproduction position of the moving image being reproduced and displayed on the display unit, according to a state of a maintenance operation performed on the image processing apparatus; and a synchronization control unit configured to transmit, when the reproduction position of the moving image is changed by said changing, changed information of the reproduction position of the moving image to the mobile information terminal, using the communication unit, to thereby cause the mobile information terminal to change the reproduction position of the moving image being reproduced and displayed on the mobile information terminal.

15. The image processing apparatus according to claim 14, further comprising
  an operation unit configured to change a reproduction position of the moving image;
  wherein the synchronization control unit transmits, when the reproduction position of the moving image being reproduced and displayed on the display unit is changed by the operation unit, transmit changed information of the reproduction position of the moving image to the mobile information terminal using the communication unit, to thereby cause the mobile information terminal to change the reproduction position of the moving image being reproduced and displayed thereon.

16. The image processing apparatus according to claim 14, wherein the moving image reproduced and displayed on the display unit includes a movie image which shows a procedure of operations for a maintenance operation for the image processing apparatus.

17. The image processing apparatus according to claim 16, further comprising a detection unit configured to detect an occurrence of an event requiring the maintenance operation,
  wherein the display unit starts reproducing and displaying of the moving image in response to the detection unit deleting the occurrence of the event requiring the maintenance operation.

18. The image processing apparatus according to claim 17, wherein the detection unit detects an occurrence of a jam or a shortage of the remaining amount of consumables.

19. The image processing apparatus according to claim 14, further comprising:
  a reading unit configured to read an image on an original to generate image data; and
  a printing unit configured to print the generated image data on a recording medium.

20. A method of controlling an image processing apparatus, comprising:
  performing a wireless connection with a mobile information terminal;
  reproducing and displaying, on a display unit, a moving image;
  distributing the moving image being reproduced and displayed on the display unit and distributing information on a reproduction position of the moving image to the mobile information terminal to thereby cause the mobile information terminal to reproduce and display the moving image from the reproduction position of the moving image;
  changing the reproduction position of the moving image being reproduced and displayed on the display unit, according to a state of a maintenance operation performed on the image processing apparatus; and
  transmitting, when the reproduction position of the moving image is changed by said changing, changed information of the reproduction position of the moving image to the mobile information terminal to thereby cause the mobile information terminal to change the reproduction position of the moving image being reproduced and displayed on the mobile information terminal.

21. A non-transitory computer-readable storage medium storing a computer-executable program for causing a computer to execute a method of controlling an image processing apparatus, the method comprising:
  performing a wireless connection with a mobile information terminal;
  reproducing and displaying, on a display unit, a moving image;
  distributing the moving image being reproduced and displayed on the display unit and distributing information on a reproduction position of the moving image to the mobile information terminal to thereby cause the mobile information terminal to reproduce and display the moving image from the reproduction position of the moving image;
  changing the reproduction position of the moving image being reproduced and displayed on the display unit, according to a state of a maintenance operation performed on the image processing apparatus; and
  transmitting, when the reproduction position of the moving image is changed by said changing, changed information of the reproduction position of the moving image to the mobile information terminal to thereby cause the mobile information terminal to change the reproduction position of the moving image being reproduced and displayed on the mobile information terminal.

* * * * *